United States Patent [19]
Warga, III

[11] Patent Number: 5,237,901
[45] Date of Patent: Aug. 24, 1993

[54] SHEAR

[75] Inventor: Philip R. Warga, III, North Canton, Ohio

[73] Assignee: Rohrer Special Machinery Inc., Boardman, Ohio

[21] Appl. No.: 863,872

[22] Filed: Apr. 6, 1992

[51] Int. Cl.⁵ .................. B23D 15/04; B26D 5/08
[52] U.S. Cl. ..................... 83/583; 83/582; 83/636; 83/694
[58] Field of Search ............ 83/582, 583, 627, 636, 83/640, 641, 694, 584, 585

[56] References Cited

U.S. PATENT DOCUMENTS

| | | |
|---|---|---|
| 354,641 | 12/1886 | Lash . |
| 477,900 | 6/1892 | Jones . |
| 635,457 | 10/1899 | Yandall . |
| 844,744 | 2/1907 | Schofield . |
| 1,565,654 | 12/1925 | Laukhuff . |
| 2,193,148 | 3/1940 | Thomas ......................... 83/641 |
| 3,195,387 | 7/1965 | Telfer ........................... 83/395 |
| 3,242,786 | 3/1966 | Giordano ..................... 83/380 |
| 3,246,552 | 4/1966 | Sieger ........................... 83/215 |
| 3,574,041 | 4/1971 | Melle . |
| 3,623,388 | 11/1971 | Gottling et al. ............. 83/582 |
| 3,672,252 | 6/1972 | Symonds . |
| 3,866,522 | 2/1975 | Oswalt, Jr. . |
| 3,918,339 | 11/1975 | Cailloux . |
| 3,968,714 | 7/1976 | Kuchyt ......................... 83/582 |
| 4,312,255 | 1/1982 | Holmstrom .................. 83/582 |
| 4,367,669 | 1/1983 | Lopetegui Legorburu .... 83/579 |
| 4,399,730 | 8/1983 | Oswalt, Jr. .................. 83/579 |
| 4,416,176 | 11/1983 | Forthmann ................... 83/582 |
| 4,476,760 | 10/1984 | Block et al. .................. 83/582 |
| 4,507,997 | 4/1985 | Ikeda .......................... 83/640 X |
| 4,624,164 | 11/1986 | Passa ........................... 83/583 X |
| 4,936,177 | 6/1990 | Ozawa et al. ................. 83/582 |
| 4,958,545 | 9/1990 | Lenzotti . |
| 5,000,070 | 1/1991 | Ozawa et al. ................. 83/582 |

*Primary Examiner*—Eugenia Jones
*Attorney, Agent, or Firm*—Fay, Sharpe, Beall, Fagan, Minnich & McKee

[57] ABSTRACT

A compensating link arrangement is operatively associated with one of two blades in a shear assembly. The angular position of the links may be selectively adjusted to alter a horizontal force component that counteracts a separation force associated with the blades during a cutting stroke. Additionally, a preload bias is provided by a spring to urge the blades together during the cutting stroke. The preload bias minimizes the gap between the cutting blades and provides a precise, burr-free cut of a work material. According to one arrangement, the compensating links are disposed on the lower blade or bed knife. Providing the compensating links on the bed knife is particularly useful in a servo-controlled version of the shear assembly since inertial forces associated with the servo-controlled, movable blade do not affect the bed knife.

18 Claims, 4 Drawing Sheets

SHEAR

BACKGROUND OF THE INVENTION

This application is directed to a shear assembly or shearing apparatus, and more particularly a shear useful for cutting hard, brittle materials, e.g., an amorphous metal having a Rockwell hardness on the order of 72. Amorphous metal is useful in transformers because of its exceptional magnetic properties that yield ultra-low core losses. For use in the transformer environment, a plural layer laminate structure of individual thin gauge metal is used. The amorphous metal has a glassy, noncrystalline structure that is hard, brittle, and stress sensitive. The combination of these various structural properties result in a material that has heretofore been difficult to cut. Particularly, either a burr was formed along the cut edge such as when cutting silicon steel, or the material would shatter when cutting an armophous material.

As is well known, a burr is formed along a cut edge as a result of the gap between the cutting edges of the blades. Typically, a shear assembly comprises a movable first blade that is reciprocated past a stationary second blade or bed knife. As the movable blade or knife moves downwardly across the bed knife, a shear force arises at contact between the blades and the workpiece. The resultant shear force may be broken down into components by simple vector addition, namely, a horizontal force component, i.e., the force of separation, and a vertically directed force component. To limit the size of the burr on the final cut workpiece, the separation force must be minimized so that a precise cut is achieved.

The subject invention is deemed to provide a new and improved shearing apparatus that counteracts the separation of the blades and dynamically urges the blades together during a cutting stroke.

SUMMARY OF THE INVENTION

The present invention contemplates a new and improved shearing apparatus that overcomes the above-referenced problems and is particularly useful for cutting brittle, hard materials.

According to the present invention, the shearing apparatus comprises a first blade movable in a generally vertical plane relative to a second blade. The blades are angularly disposed relative to one another in two mutually perpendicular planes. One of the blades is adapted to pivot about an axis offset from and substantially parallel to its cutting edge to establish a horizontally disposed canceling force that urges the blades together during a cutting stroke.

According to another aspect of the invention, the location of the pivot axis may be selectively altered to vary the canceling force that opposes the force of separation during a cutting stroke.

According to yet another aspect of the invention, the pivoting blade is biased toward the other blade.

According to a still further aspect of the invention, the pivoting blade defines the stationary blade or bed knife so that inertial forces resulting from vertical acceleration have no effect thereon.

A principal advantage of the invention resides in a shearing apparatus that counteracts the force that tends to separate the blades during a cutting stroke.

Another advantage of the invention is found in the ability to make cuts without leaving a burr on the workpiece.

Yet another advantage is realized by the optimum blade life attained by virtue of limiting the force that drives the blades together.

A further advantage resides in increased cutting speed by incorporating the pivoting action into the stationary blade.

A still further advantage relates to the blade overlap that compensates for the separation force and whereby column bearing wear has no effect on operation of the shearing apparatus.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
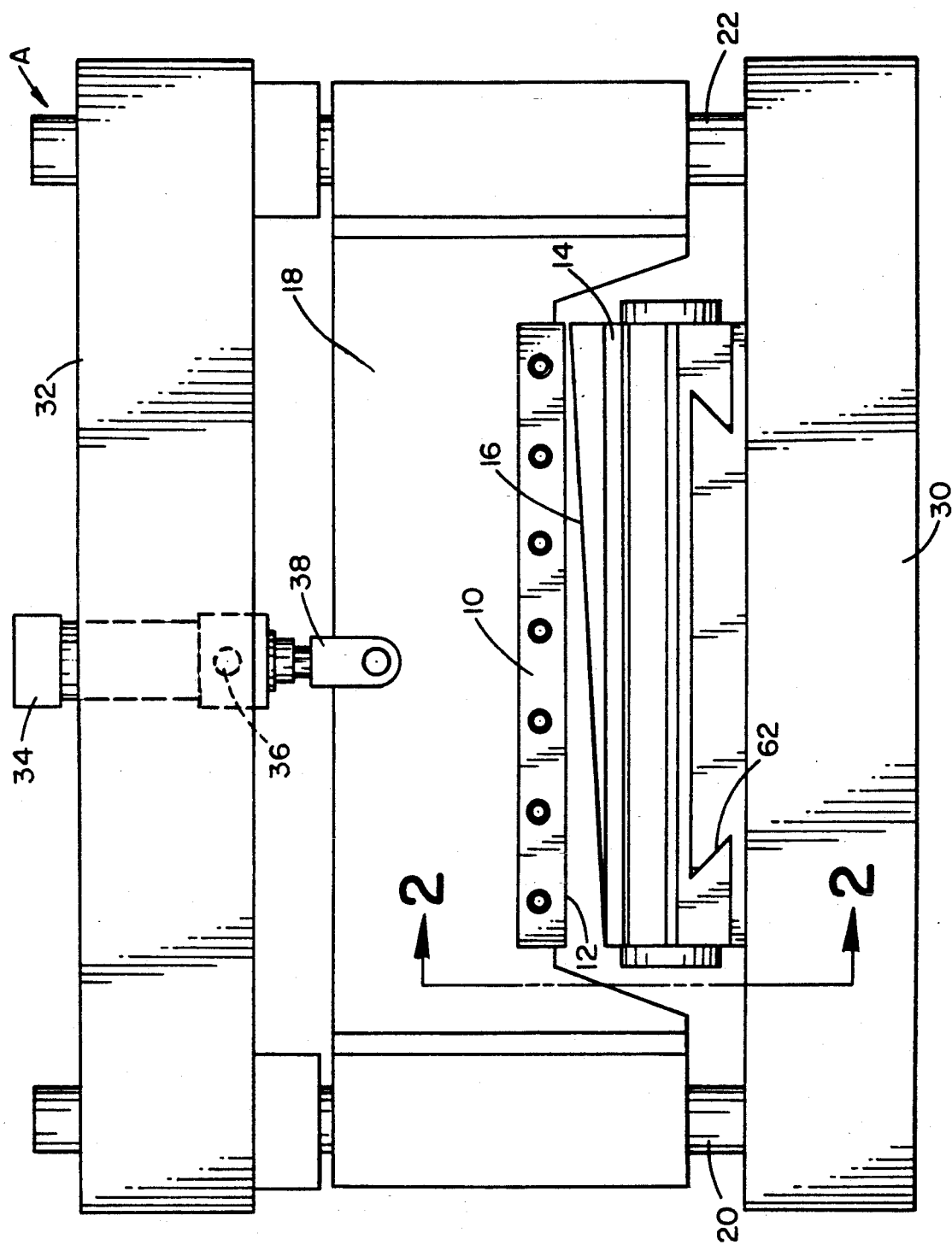
FIG. 1 is an elevational view of the subject new shearing apparatus.

Referring now to the drawings wherein the showings are for purposes of illustrating the preferred embodiments of the invention only and not for purposes of limiting same, the FIGURES show a shearing apparatus A particularly useful for cutting hard, brittle materials such as an amorphous metal or silicon steel sheet or workpiece B.

More particularly, and with reference to FIG. 1, the shearing apparatus A includes a movable first blade or knife 10 having a cutting edge 12 and a second blade 14 having a cutting edge 16. The first blade is secured to a movable ram 18 which is adapted for vertical reciprocating movement along spaced vertical guide posts 20, 22. Lower ends of the posts are secured to a base member 30 and suitable bushings or bearing members are provided along the posts to provide smooth sliding movement of the ram on the guide posts. Upwardly spaced from the base member and interconnecting the upper ends of the posts is a frame 32. Generally centrally disposed on the frame is an actuator, for example, an hydraulic cylinder 34 for driving the reciprocating ram. The housing of the actuator is secured at 36 to the frame and the rod 38 fastened to the ram through use of any well known means, such as a pin and clevis arrangement. Since the construction and operation of hydraulic cylinders, or other drive means, is well known in the art and forms no part of the subject invention, further details herein are deemed unnecessary. Extension of the rod relative to the cylinder drives the ram and first blade downwardly past the second blade 14 defining a cutting stroke that shears the workpiece along the cutting edges.

As shown in FIG. 1, the first and second blades are angularly disposed relative to one another. More specifically, the cutting edge of the first blade is disposed in a generally horizontal plane while the cutting edge 16 of the second blade has a rake or angular disposition in a generally vertical plane preferably in the range of 1° to 2°. Of course, different angular relations between the blades may be used without departing from the scope and intent of the subject invention. Still further, the blades are angularly disposed relative to one another in the horizontal plane. That is, and as viewed in FIG. 2, the blades have a crossover of approximately 0.010 inch per inch. Thus, as shown in FIG. 1, at the beginning of a cutting stroke the right-hand end of the first and second blades have their cutting edges substantially aligned in vertical relation. The left-hand end of the blades, though, are offset in the vertical direction. Specifically, the left-hand end of the second blade is vertically spaced below and behind the left-hand end of the first blade cutting edge. Described in another manner, FIG. 2 shows the left-hand end of the blades of FIG. 1 so that the remote end of the second blade 14 (left-hand end as shown in FIG. 1) is disposed rightwardly as shown in FIG. 2, i.e., beneath the first blade.

As the first blade is driven downwardly by the ram, a shearing force 42 arises that may be considered as two primary component forces. The first component force is a downwardly or vertically directed shearing force represented by arrow 44 acting on blade 14. The second component force is a blade separating force shown as a horizontal component and designated by arrow 46, again acting on blade 14, that results as the workpiece B is sheared. Without counteracting the blade separating force, experience indicates that a rough cutting edge or burr results on the workpiece or in some instances such as amorphous material the workpiece may shatter. As will be appreciated, the burr is often unacceptable in selected applications of the workpiece. This is particularly true in cutting thin gauge silicon steel.

To compensate for the blade separating force, the subject invention provides a means for pivoting one of the blades about an axis offset from and substantially parallel to the cutting edge of the blade. For example, as best illustrated in FIG. 2, the lower or second blade is pivoted about a pair of cooperating links 50, 52. Each link has a first or upper end pivotally connected to a second blade holder 54 by means of pins 56. Further, a second or lower end of each link is pivotally connected to a slide carriage 58 by means of pins 60. Together, the links 50, 52, blade holder 54 and slide carriage 58 define a conventional four bar linkage arrangement. The slide carriage 58 is, in turn, adapted for selective sliding movement in a horizontal plane by virtue of its dovetail arrangement 62 (FIG. 1) with the base member 30.

Figure 2:
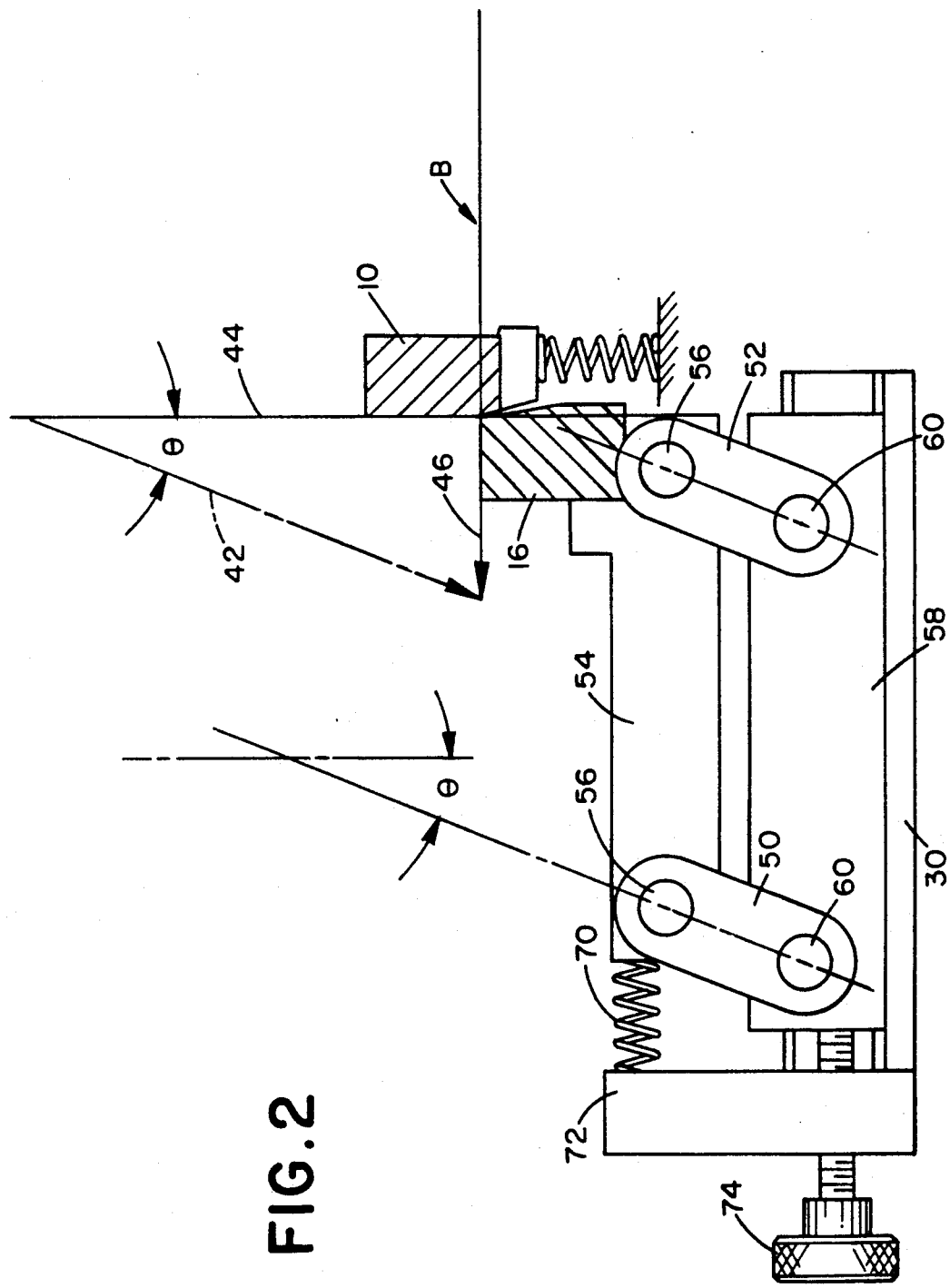
FIG. 2 is an enlarged cross-sectional view taken generally along the lines 2—2 of FIG. 1.

The blade holder 54 is urged rightwardly as shown in FIG. 2 relative to the slide carriage by a biasing means such as spring 70. One end of the spring engages the blade holder while the opposite end of the spring engages a vertically disposed block 72 that is fixed relative to the base member 30. Preferably, the biasing means exerts a force in the range of approximately 5 pounds to urge the second blade against the first blade during the cutting stroke.

Through inclusion of the pivoting means, a countering force is imposed by the second blade during the cutting stroke that is equal and opposite to the horizontal component of the resultant shear force 42 identified herein as the blade separating force 46. By orienting the links at an angle $\theta$ relative to vertical, an upwardly directed, equal and opposite shearing force opposes the force of the actuating cylinder and a horizontal component is defined that counters the blade separating force 46. If the angle $\theta$ is set properly, the dynamic countering force is equal and opposite to the blade separating force. As a result, the only force urging the blades together is provided by the biasing spring 70, which as described above is approximately 5 pounds. This compensating link arrangement is particularly desired because of the ability to adjust the angle of the links or angle $\theta$. As best shown in FIG. 2, an adjustment knob 74 is defined by a threaded member that extends through the block 72 and urges the slide carriage rightwardly if a smaller angle is desired or leftwardly if a greater angle is desired. The optimum angle can then be set so that only the slight preload of the biasing spring 70 urges the blades together.

As a result of this adjustable pivoting arrangement, precise cuts are made in the workpiece without a resultant burr because of the zero gap between the blades. Blade life is also optimized as a result of this arrangement. Because the countering force cancels the effect of the blade separation component force, only a small biasing force on the order of 5 pounds is required to urge the blades together. This is a minimal force that does not impose undue rubbing, and resultant wear, of the blades. The angular relationship between the blades is also constantly maintained through the cutting stroke. As the first blade moves downwardly, the second blade rides against the first blade and moves away in a parallelogram motion created by the compensating links. This cutting action accommodates the crossover between the blades and yet maintains the constant angular relationship due to the link arrangement. This would not occur in a single pivot arrangement (to be described below with reference to the embodiment of FIG. 4) whereby the angular relationship between the blades would change during the cutting stroke.

Still another advantage of the FIGS. 1-2 embodiment is realized when combined with a servo-controlled hydraulic cylinder. Precise control of the cutting stroke is achieved with a servo-controlled hydraulic cylinder which permits one to profile the cutting speed. That is, as the blade approaches the end of the cutting stroke, the blade is decelerated which, if the blade is pivoted, results in the driven blade moving away from the fixed blade. If the moving blade is the pivoting blade and thus spring biased, it is also urged toward the fixed blade. These inertial forces can potentially result in damage to the cutting blades. With the compensating link arrangement shown in FIGS. 1 and 2 in which the links are operatively associated with the bottom blade, the effect of the inertial forces is minimized. The vertical acceleration and decelerations will have no effect on the gap between the blades and each cutting stroke can be completed more quickly and without damage to the blades.

Figure 3:
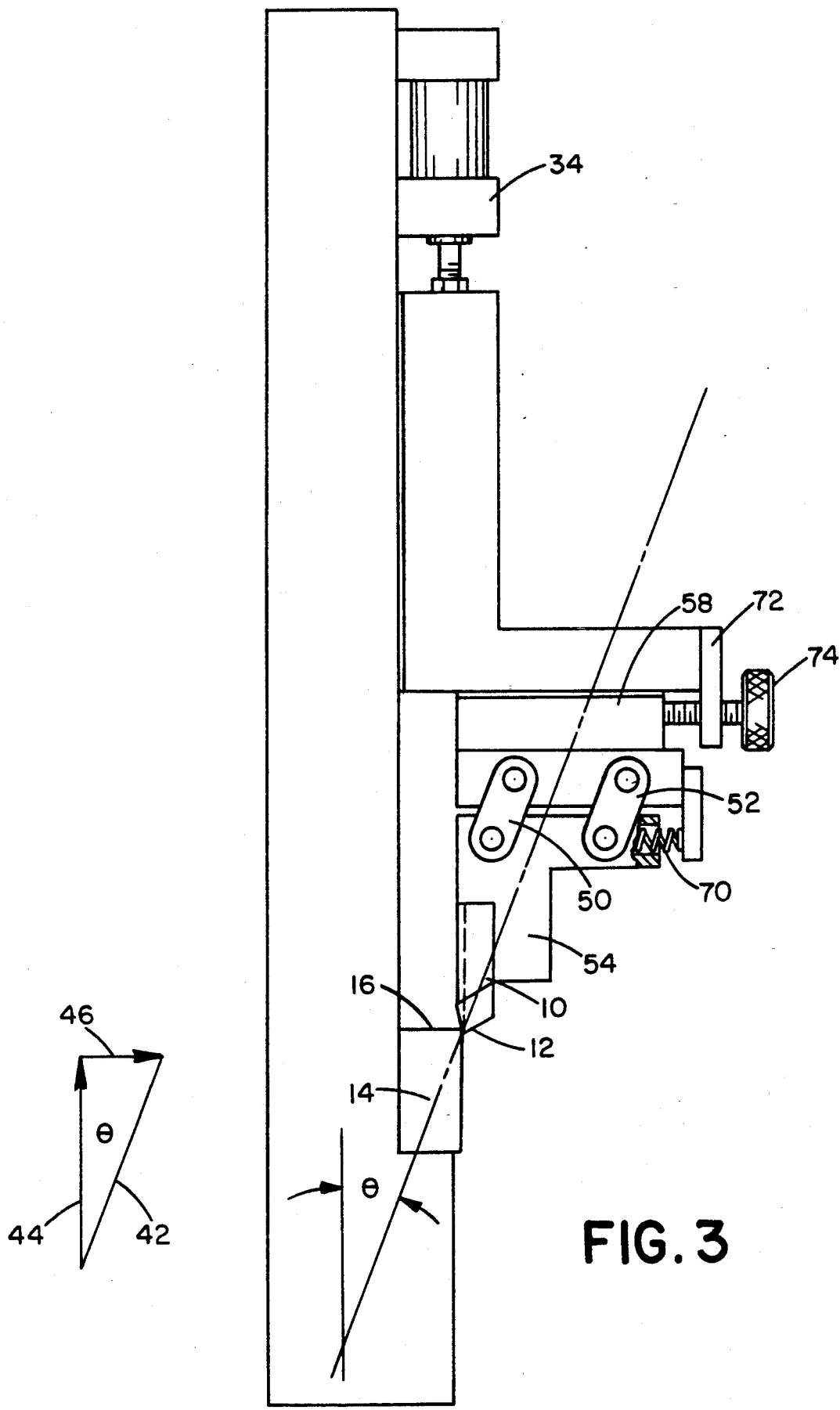
FIG. 3 is a view similar to FIG. 2 of a second preferred embodiment.

FIG. 3 shows another preferred arrangement that incorporates many of the principles of the embodiment of FIGS. 1 and 2. Therefore, like numerals will refer to like parts while new numerals will refer to new elements. According to the embodiment of FIG. 3, the compensating links 50, 52 are associated with the movable blade 10. Again, the movable blade is hydraulically driven past the second blade or bed knife 16. Selective adjustment of the slide carriage 58 by means of the adjusting knob 74 sets the angle $\theta$ in order to counteract the force of blade separation. In a similar fashion, the blade holder 54 for the movable first blade is urged toward the second blade by a biasing sprig 70. This preload bias insures that the crossover between the blades is maintained and a precise, linear traveling cut made in the work material.

Figure 4:
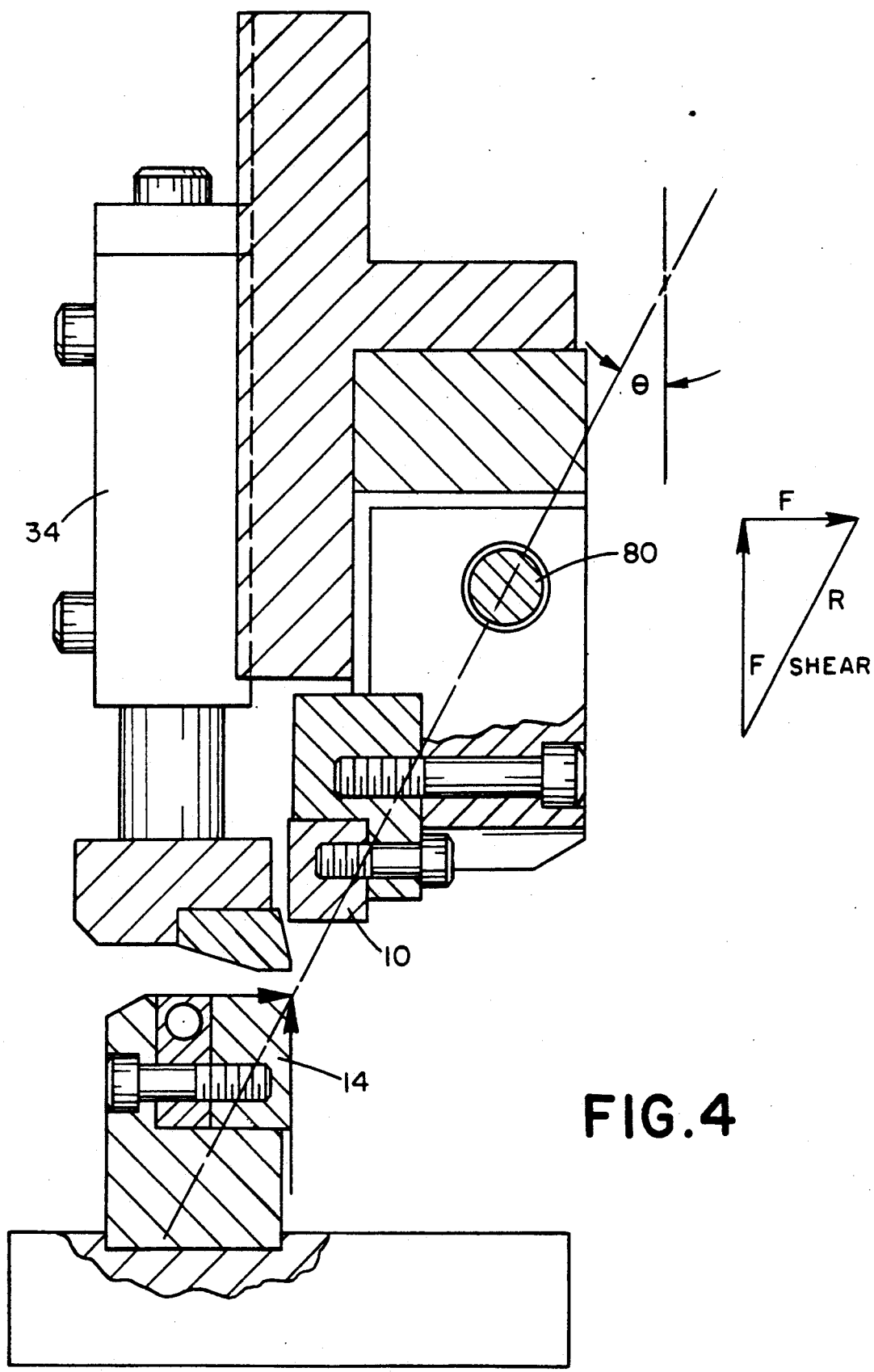
FIG. 4 is a view similar to FIG. 3 of yet another preferred embodiment of the subject shearing apparatus.

The arrangement of FIG. 4 discloses yet another preferred embodiment incorporating selected principles of the subject invention. Again, like elements will be referred to by like numerals while new elements will be referred to by new numerals. Like the embodiment of FIG. 3, the arrangement in FIG. 4 does not have all of the benefits and advantages offered by the embodiment of FIGS. 1 and 2. It does, though, overcome the force of separation between the blades during the cutting strokes. Specifically, the movable first blade 10 is driven by hydraulic cylinder 34. The movable blade, though, pivots about pin 80 during the cutting stroke. Since the pin 80 is offset from the line of contact between the cutting blades 10, 14, a torque or moment is defined on the moving blade. This advantageously counteracts or compensates for the blade separation force during the cutting stroke. The gap between the blades is neutralized and a preload bias provided by a spring will urge the blades together.

Another major difference in this embodiment is that the angle θ is not selectively adjustable as in the compensating link arrangements of the earlier embodiments. Thus, the angle is approximately 30° and may be otherwise altered to a different preset angle depending on the particular application involved.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A shearing apparatus comprising:
   a movable first blade having a cutting edge;
   means for selectively reciprocating the first blade through a cutting stroke;
   a second blade having a cutting edge located for operative cutting relation with the first blade, the first and second blades being angularly disposed relative to one another in two mutually perpendicular planes;
   means for biasing the first and second blades together;
   means for pivoting one of the first and second blades about an axis offset from and substantially parallel to the cutting edge of the other of the first and second blades to dynamically establish a canceling force that urges the blades together during a cutting stroke and counters a force of separation, defined as a horizontal vector force component of a resultant shear force; and,
   the pivoting means including means for selectively altering the location of the pivoting axis to increase or decrease the canceling force.

2. The sharing apparatus as defined in claim 1 wherein the pivoting means includes a pair of link arms interconnecting the first blade to the reciprocating means.

3. The shearing apparatus defined in claim 2 wherein the link arms define a four bar linkage arrangement and further comprises means for maintaining the link arms in a desired angular orientation.

4. The shearing apparatus as defined in claim 1 wherein the cutting edge of the first blade is oriented at an angle of approximately 2° in a vertical plane relative to the cutting edge of the second blade.

5. The shearing apparatus as defined in claim 1 wherein the cutting edges of the first and second blades overlap in a horizontal plane at an angle of approximately 0.010 inch/inch.

6. A shearing apparatus comprising:
   a first blade having a cutting edge;
   a second blade having a cutting edge positioned for operative cutting relation with the first blade;
   means for moving the first blade through a cutting stroke; and
   means for pivoting the second blade about an axis offset from and generally parallel to the cutting edge of the first blade to dynamically establish a canceling force that counters a blade separation force, which is defined as a horizontal vector force component of a resultant shear force, the pivoting means includes a pair of parallel links, each link being pin mounted at a first end to a blade holder receiving the second blade and pin mounted at a second end to a slide carriage.

7. The shearing apparatus as defined in claim 6 wherein the second blade is fixed.

8. The shearing apparatus as defined in claim 6 wherein the first blade is angularly disposed relative to the second blade in a generally horizontal plane.

9. The shearing apparatus as defined in claim 8 wherein the first blade is also angularly disposed relative to the second blade in a generally vertical plane.

10. The shearing apparatus as defined in claim 6 wherein the first blade is angularly disposed relative to the second blade in a generally vertical plane.

11. The shearing apparatus as defined in claim 6 wherein the slide carriage is mounted to a frame for selective sliding movement in a direction generally perpendicular to the cutting stroke.

12. The shearing apparatus as defined in claim 6 further comprising means for biasing the blade holder toward the first blade.

13. The shearing apparatus as defined in claim 6 further comprising means for selectively altering the pivoting means to vary the canceling force.

14. The shearing apparatus as defined in claim 13 wherein the altering means includes an adjustment member that operatively engages the slide carriage to vary its position.

15. A shearing apparatus comprising:
   a frame;
   a first blade having a cutting edge;
   means for selectively driving the first blade through a cutting stroke relative to the frame;
   a second blade operatively secured to a slide carriage, the second blade having a cutting edge and disposed for cutting relation with the cutting edge of the first blade;
   a pair of parallel links interposed between the frame and slide carriage, each link being pin mounted at opposite ends to permit the position of the second blade to be selectively altered relative to the first blade and establish a canceling force that urges the blades together during a cutting stroke and counters a force of separation, defined as a horizontal vector force component of a resultant shear force;
   means for selectively altering the position of the slide carriage relative to the frame to vary an angular orientation of the links and second blade and, in turn, change the canceling force; and, means for biasing the second blade toward the first blade.

16. The shearing apparatus as defined in claim 15 wherein the cutting edge of the first blade is oriented at an angle of approximately 2° in a vertical plane relative to the cutting edge of the second blade.

17. The shearing apparatus as defined in claim 16 wherein the cutting edges of the first and second blades overlap in a horizontal plane at an angle approximating 0.010 inch/inch.

18. The shearing apparatus as defined in claim 15 wherein the cutting edges of the first and second blades overlap in a horizontal plane at an angle approximately 0.010 inch/inch.

* * * * *